United States Patent
Huang

(10) Patent No.: US 10,915,929 B1
(45) Date of Patent: *Feb. 9, 2021

(54) DETECTING USER INTERACTION AND DELIVERING CONTENT USING INTERACTION METRICS

(71) Applicant: Amazon Technologies, Inc., Seattle, WA (US)

(72) Inventor: Jim Huang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 281 days.

This patent is subject to a terminal disclaimer.

(21) Appl. No.: 15/240,752

(22) Filed: Aug. 18, 2016

(51) Int. Cl.
*G06Q 30/00* (2012.01)
*G06Q 30/02* (2012.01)
*H04N 21/2543* (2011.01)
*H04N 21/472* (2011.01)
*H04N 21/475* (2011.01)

(52) U.S. Cl.
CPC ..... *G06Q 30/0275* (2013.01); *G06Q 30/0249* (2013.01); *H04N 21/2543* (2013.01); *H04N 21/4758* (2013.01); *H04N 21/47211* (2013.01)

(58) Field of Classification Search
CPC ............................... G06Q 30/00; G06Q 10/00
See application file for complete search history.

(56) References Cited

U.S. PATENT DOCUMENTS

| 8,099,502 | B2 * | 1/2012 | Genske | H04N 1/2179 709/217 |
| 9,626,691 | B2 * | 4/2017 | Wang | G06Q 30/0246 |
| 10,445,757 | B2 * | 10/2019 | Klein | G06Q 30/0207 |
| 2007/0174124 | A1 * | 7/2007 | Zagofsky | G06Q 30/02 705/14.46 |
| 2011/0016000 | A1 * | 1/2011 | Cronshaw | G06Q 30/02 705/14.55 |
| 2011/0040616 | A1 * | 2/2011 | Kannan | G06Q 30/02 705/14.45 |
| 2011/0153428 | A1 * | 6/2011 | Ramer | G06Q 30/00 705/14.64 |
| 2011/0231264 | A1 * | 9/2011 | Dilling | G06Q 30/02 705/14.71 |

(Continued)

*Primary Examiner* — Naresh Vig
(74) *Attorney, Agent, or Firm* — Eversheds Sutherland (US) LLP

(57) ABSTRACT

Systems, methods, and computer-readable media are disclosed for detecting user interactions and delivering content using interaction metrics. In one embodiment, an example method may include receiving a bid request for an available content delivery slot, the bid request comprising context information, determining first candidate content for the available content delivery slot, and determining a first base bid value for the first candidate content. Example methods may include determining a predicted conversion rate for an impression of the first candidate content served at the available content delivery slot, determining an estimated revenue for serving the impression at the available content delivery slot, determining a first bid modifier using the predicted conversion rate and the estimated revenue, and sending a response to the bid request comprising a first bid amount, wherein the first bid amount is based at least in part on the first base bid value and the first bid modifier.

20 Claims, 7 Drawing Sheets

(56) References Cited

U.S. PATENT DOCUMENTS

| | | | |
|---|---|---|---|
| 2013/0006758 A1* | 1/2013 | Hegema | G06O 30/0251 |
| | | | 705/14.46 |
| 2013/0066707 A1* | 3/2013 | Umeda | G06Q 30/0272 |
| | | | 705/14.42 |
| 2015/0088639 A1* | 3/2015 | Shay | G06Q 30/0254 |
| | | | 705/14.46 |
| 2015/0154631 A1* | 6/2015 | Umeda | G06Q 30/0243 |
| | | | 705/14.42 |
| 2016/0343029 A1* | 11/2016 | Sethuraman | G06Q 30/0255 |
| 2018/0047053 A1* | 2/2018 | Owens | G06Q 30/0256 |

* cited by examiner

DETECTING USER INTERACTION AND DELIVERING CONTENT USING INTERACTION METRICS

BACKGROUND

Content may be presented on electronic devices to users such that users can consume the content. Users may consume or interact with certain content while other content may not be consumed or interacted with. Similarly, certain users may interact with certain content, while other users may not interact with the same content. Determining whether a user may interact with presented content may be desirable, such that producers of content can produce effective content, and also so that certain content can be delivered to certain users that may be likely to interact with the particular content. Content creators may desire to allocate resources on delivering content to users that will or will likely interact with the content.

Figure 1:
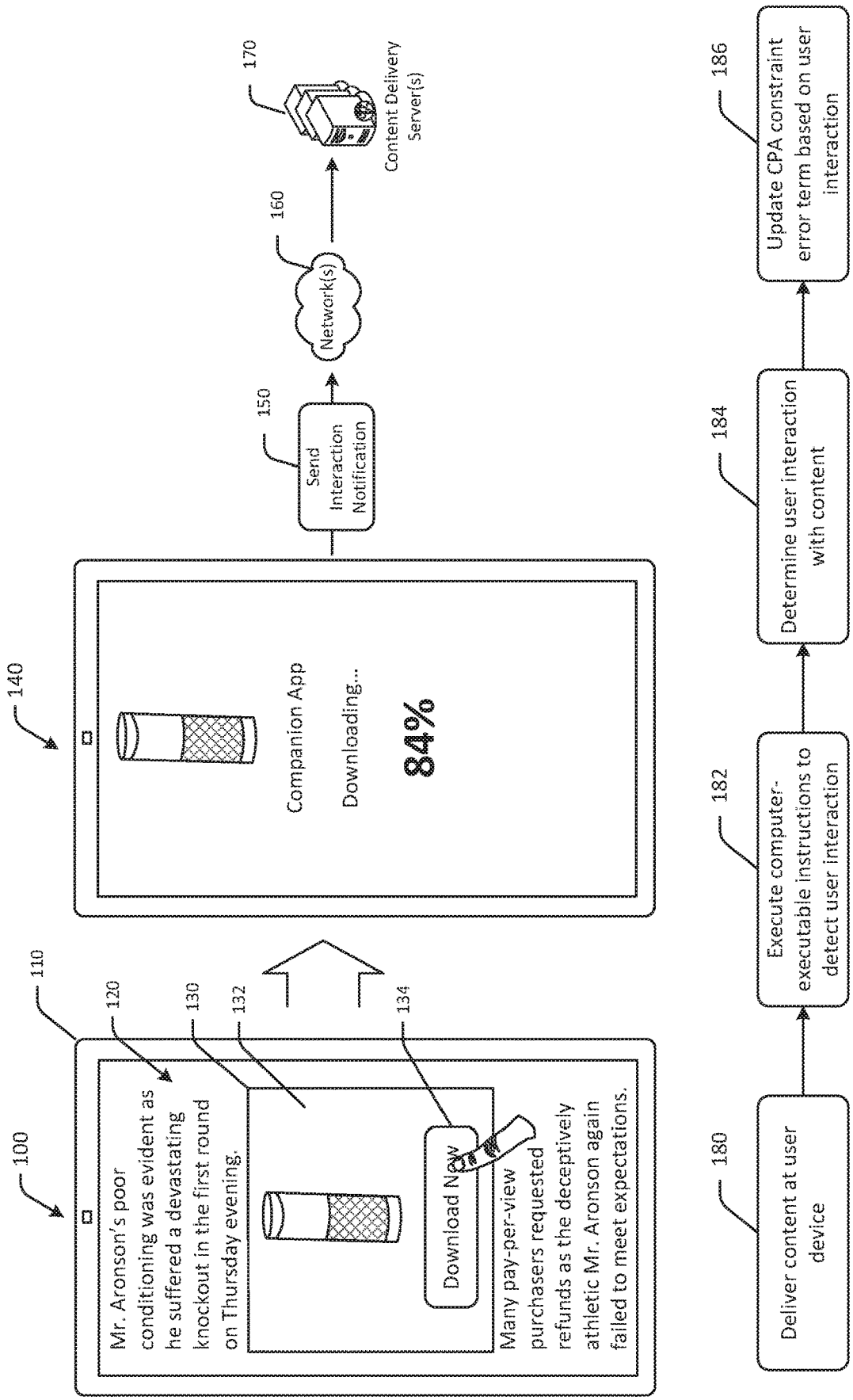
FIG. 1 is a hybrid system and process diagram illustrating detecting user interactions and delivering content using interaction metrics in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Digital content may be presented at electronic devices, such that users may consume the digital content. Content may be provided by content creators that desire for the content to be consumed or interacted with by users. In some instances, users may not consume or interact with content, and may instead navigate away from or otherwise skip content that is presented rather than consuming or interacting with the content. Content creators or other interested parties may desire to determine a likelihood that one or users may interact with content if the content is presented to the respective user(s). The likelihood of interaction may impact a value of serving a content impression to the user for the content creator. For example, if a user is very likely to interact with certain content, serving an impression of the content to the user may be of relatively high value to a creator of the content. As a result, the content creator may be willing to pay a relatively high price in order to serve the content to the user. If a user is unlikely to interact with certain content, the content creator may not derive much value from serving a content impression to the user, and as a result, may not be willing to pay a high price in order to present a content impression to the user.

Embodiments of the disclosure may determine a likelihood that one or more users may interact with certain content, and based at least in part on the likelihood, certain embodiments may determine an expected value that can be derived from serving a content impression to the user. The expected value and/or likelihood that the user will interact with the content may be used to determine an amount to pay, such as a bid amount, in order to serve a content impression to a user. Embodiments of the disclosure may further manage delivery of content associated with a content delivery campaign so as to satisfy a cost-per-action delivery constraint. A cost-per-action constraint may represent a target or maximum dollar value that a content creator or provider is willing to pay for each completed user interaction attributed to the content delivery campaign. User interactions may be any desired user interaction, such as click-throughs, views, purchases, downloads, credit card signups, or any other conversion. An interaction event may be attributed to the content delivery campaign when a user performs a desired interaction in response to an impression of content associated with the content delivery campaign. Because embodiments of the disclosure can determine a likelihood of conversion before a content impression is delivered, embodiments of the disclosure may actively manage content delivery settings and/or strategies, such as bidding strategies, to deliver content of a content delivery campaign while satisfying one or more delivery constraints, such as a cost-per-action constraint and/or a budget constraint.

Campaign managers and/or content creators may provide initial delivery settings for content associated with a content delivery campaign. The content delivery campaign may include one or more pieces of content, such as different creative materials or different forms or types of content, and may be delivered or presented to users at user devices. One or more remote servers may manage delivery and/or presentation of content over the course of a content delivery campaign. Campaign managers and/or content creators may allocate resources towards the delivery of content in a content delivery campaign. In order to optimize usage or expenditure of allocated resources, content creators and/or campaign managers may desire to determine whether a user is going to interact with content, or a probability that a user will interact with content, before the content is delivered. Based at least in part on the determination, content creators or other parties may determine whether or not to present the content to a particular user, and may also determine an amount of resources to allocate for the delivery of the content to the user. Content creators may also implement a cost-per-action constraint on delivery of content associated with a campaign, which may be a target or maximum expense per completed user interaction for content impressions associated with a content delivery campaign, or per content impression that is interacted with by a user. Cost-per-action constraints may be measured in dollar cost per action, or in another suitable metric. In this manner, content creators may set a target or maximum value the content creator is willing to pay for delivery of content to users that actually interacted with the content. Cost-per-action constraints can be used to manage and/or optimize delivery of content for a content delivery campaign.

Embodiments of the disclosure may determine cost-per-action constraints for a content delivery campaign, and may deliver content in accordance with applicable cost-per-action constraints, thereby optimizing delivery of content while satisfying constraints of the content creator and/or campaign manager. Certain embodiments may monitor or otherwise track a status of cost per action over the flight time of a content delivery campaign, so as to meet cost-per-action constraints by the end of the campaign. Using one or more predictive algorithms, certain embodiments may determine a likelihood that a certain user is going to interact with content, or a probability of conversion, prior to delivering the content. The likelihood may be converted into a binary outcome, such as a determination that the user will either interact with the content or will not interact with the content. Based at least in part on the determination of whether the user will interact with the content, embodiments of the disclosure may adjust a bidding strategy or other applicable strategy in order to deliver and/or serve the impression to the user. The predictive algorithm used to determine whether the user will interact with particular content may be updated and/or modified periodically, as additional empirical data is received. For example, accuracy of the predictive model may be improved using machine learning techniques as data regarding whether or not the user actually interacted with the content becomes available after delivery, compared to the initial predicted determination.

Embodiments of the disclosure may optimize content delivery campaign performance subject to cost-per-action constraints by real-time ranking of candidate content for an available content delivery slot via the use of bid modifiers that incorporate a status of the campaign with respect to the cost-per-action constraint (e.g., how far off is the current cost per action from the target or maximum cost per action?, etc.). Certain embodiments may periodically update bid modifiers for candidate content based at least in part on the status of the campaign, or as additional data becomes available.

This disclosure relates to, among other things, systems, methods, computer-readable media, techniques, and methodologies for detecting user interactions and delivering content using interaction metrics. Embodiments may select certain available content delivery slots for submitting bids on for certain candidate content, where the amount of the bid is based at least in part on a cost-per-action constraint associated with the candidate content. Over the flight time of the campaign, campaign effectiveness or performance may be optimized while satisfying the cost-per-action constraint, as well as satisfying or partially satisfying any other constraints, thereby providing content creators with a fixed cost or maximum cost per action that can be set prior to delivery of content or initiation of a content delivery campaign. By predicting whether a user will interact with content that may be presented, embodiments of the disclosure may enable content creators to select a cost-per-action constraint that provides control over a target or maximum cost to the content creator per action. As a result, content delivery campaigns may be more effective and performance may therefore be improved.

Referring to FIG. 1, an example use case illustrating detecting user interactions and delivering content using interaction metrics is depicted. In the example of FIG. 1, a content creator or a campaign manager may set up or initiate a content delivery campaign. The content creator may indicate a cost-per-action constraint for the content delivery campaign. For example, the content creator may indicate that a cost per action for content associated with the content delivery campaign is not to exceed $5. Additional constraints, such as budgetary and/or targeting constraints may also be set for the content delivery campaign. The content delivery campaign may be initiated.

To deliver content associated with the content delivery campaign, one or more content delivery servers 170 may communicate with one or more remote servers, such as ad exchange servers, publisher servers, and other servers, to serve content impressions in available content delivery slots. Available content delivery slots may be locations on digital content at which content can be delivered, such as locations on a webpage, positions within a mobile app (e.g., banner slots, interstitial slots, popup slots, pop-under slots, etc.), or other suitable locations where digital content can be presented. In one example, an available content delivery slot may be available when a user is browsing digital content with a location that is available for content to be presented. To determine what content is to be presented in that available content delivery slot, an auction may be conducted, where content associated with a highest bid may be given an opportunity or the right to serve an impression in the available content delivery slot. To determine a bid amount for a particular available content delivery slot, a predicted conversion rate indicating a likelihood that the user will interact with the content may be determined. The determination may be binary, a probability value, or another suitable metric. Based at least in part on the predicted conversion rate, a bid amount may be determined for particular content.

For example, in FIG. 1, a user may be browsing digital content 120 at a first user interface 100 on a user device 110. The digital content 120 may be a news article or other content. The user may manipulate or scroll through the digital content 120. An available content delivery slot 130 at which a content impression can be served may be available at the digital content 120. For example, the user may scroll through the digital content 120 and the available content delivery slot 130 may appear. To determine what content to present at the available content delivery slot 130, an auction may be conducted. The auction may be conducted at any time, for example, prior to the user scrolling to the s available content delivery slot 130. The auction may include receiving a bid request for the available content delivery slot 130. The bid request may include contextual information, such as user attributes for the user, chronological information, geographic location information, time of day, contextual information for the content around the available content delivery slot, and other contextual information. Based at least in part on the bid request, a set of one or more candidate content may be determined, for example, by the content delivery server(s) 170. Candidate content may be determined from content that is available for potential delivery. In some instances, candidate content may be based at least in part on targeting criteria associated with respective content. For example, targeting criteria for certain content may indicate that the user for which the content delivery slot is available does not match the targeting criteria, and as a result, the content may not be candidate content for that particular content delivery slot. User information, in this example, may be determined based at least in part on context information and/or other information associated with the bid request.

Base bid values may be determined for candidate content. Base bid values may be values that can be submitted in response to the bid request. Base bid values for candidate content may be determined in any suitable manner. In one example, base bid values may be determined for candidate content based at least in part on an expected value or a value that can be expected from presenting an impression of particular content in the available content delivery slot. Factors such as campaign performance, pacing, budget or budget consumption status, and other factors may be used to determine base bid values.

Base bid values, which may be base valuations, may not account for long-term constraints, such as cost-per-action constraints that may be applicable to the entire campaign, as opposed to a discrete portion of a campaign. Bid modifiers may be used to account for long-term delivery constraints.

A bid modifier may be determined for one or more of the candidate content. Bid modifiers may be a value that adjusts the base bid value for particular content. Bid modifiers may be positive or negative. Bid modifiers may be used to correct a trajectory of a content delivery campaign with respect to one or more constraints. For example, if a content delivery campaign has a cost-per-action constraint of $2 maximum cost per action, and the campaign is currently at a value of $4 per action, a bid modifier for content associated with that campaign may be negative, so as to bring the cost per action downwards, or closer to the cost-per-action constraint.

For content associated with a cost-per-action constraint, bid modifiers may be based at least in part on a likelihood that the content impression will be interacted with or will otherwise lead to occurrence of a desired action. A predicted conversion rate may be determined, which indicates whether or not, or a likelihood, a user will interact with the content impression. The predicted conversion rate may be determined using one or more algorithms and may be based at least in part on the bid request and/or context information.

In some embodiments, bid modifiers may be equal to, or a function of, a shadow price, or a price that is indicative of a cost/benefit of serving additional content impressions when the actual cost per action does not align with the cost-per-action constraint. Shadow pricing may represent a maximum price for an additional content impression and may be related to a perceived benefit that may be obtained from serving the additional content impression.

Certain candidate content may be associated with one or more bid modifiers. For example, first candidate content may be associated with a cost-per-action constraint, and thus a bid modifier based at least in part on the cost-per-action constraint may be determined. Other candidate content may be associated with constraints such as budget constraints, pacing constraints, and other constraints, and bid modifiers for such candidate content may be determined accordingly. Such bid modifiers may be combined into a single bid modifier.

Adjusted bid values based at least in part on the base bid value and the respective bid modifiers for one or more, or each, of the candidate content may be determined. The adjusted bid values may be sorted, and the candidate content may be ranked based at least in part on the respective adjusted bid values. Candidate content associated with the highest ranked adjusted bid value may be determined. A response to the bid request may be submitted for the candidate content associated with the highest ranked adjusted bid value. The response to the bid request may include a bid amount, which may be the adjusted bid value for the highest ranked candidate content.

After submitting the response to the bid request, a notification may be received indicating that the bid amount was a winning bid amount. The notification may indicate that an impression of the content may be served at the available content delivery slot. Delivery and/or presentation of an impression of the content may be facilitated.

In the example of FIG. 1, first candidate content 132 may be associated with a cost-per-action constraint. An auction may be conducted for the available content delivery slot 130. The content delivery server 170 may receive a bid request for the auction, and may determine candidate content for the available content delivery slot 130. The content delivery server 170 may determine base bid values for the candidate content, as well as applicable bid modifiers. For example, the first candidate content 132 may be associated with a cost-per-action constraint. The desired action for the first candidate content 132 may be to trigger downloading of data, such as download of a mobile application. To determine a bid modifier for the first candidate content 132, the content delivery server 170 may determine a probability that the user of the user device 110 will interact with the first candidate content 132 impression if presented. The determination may be based at least in part on the bid request and/or context information. The determination may be output as a binary output, a percentage output, a probability output, or another suitable metric.

After or while determining base bid values and any bid modifiers for candidate content, the candidate content may be ranked by base bid values and/or adjusted bid values to determine a highest ranked, or top ranked, bid. A response to the bid request may be submitted for the candidate content associated with the highest ranked bid. The bid amount may be equal to the base bid value or the modified bid value in the instance of bid modifiers.

In FIG. 1, the first candidate content 132 may be the top ranked bid. For example, the base bid value for the first candidate content 132 may be $2.55, and a bid modifier may be +$0.44, for an adjusted bid value of $2.99. The bid modifier may be determined based at least in part on the likelihood that the user of the user device 110 will interact with the impression of the first candidate content 132. For example, the user may meet some or all of targeting criteria or may be a strong match with respect to targeting criteria for the candidate content. As a result, a likelihood that the user will interact with the content may be relatively higher than for content where the user may not meet certain targeting criteria. In some embodiments, a probability that the user will interact with the content impression may be determined. The probability may be used to determine a binary output of whether or not the user will interact with content. For example, a probability of 50% or greater may indicate that the user will interact with the content, while a probability of less than 50% may indicate that the user will not interact with the content. Probability thresholds (e.g., greater than or equal to 70% indicates the user will view, etc.) may be set and/or modified based on any number of factors, including a delivery schedule, pacing indicator, and other factors. Using the probability and/or determination of whether the user will interact with the content, a bid modifier may be determined. The bid modifier may be represented as an amount by which a base bid value is increased or decreased in light of, in one example, a cost-per-action constraint associated with certain content.

The base bid value for the first candidate content 132 in addition to the bid modifier for the first candidate content 132 may be the top ranked bid, and as a result, a response to the bid request for the available content delivery slot 130 may be submitted with a bid amount that may be equal to the base bid value and the bid modifier. The response to the bid request may include additional information, such as a content identifier that identifies the first candidate content 132, or other information. An auction and/or second-price auction process may be conducted to determine a winning bid for the available content delivery slot 130. A winning bid notification may be sent by the server or other computer system(s) at which the auction process is conducted.

The bid amount submitted in FIG. 1 may be a winning bid. The content delivery server 170 may therefore receive a winning bid notification. The winning bid notification may indicate that the first candidate content 132 may be presented at the available content delivery slot 130. At block 180 of the process flow illustrated in FIG. 1, the content delivery server 170 may deliver content at the user device 110. The delivered content impression 132 may include a button, such as a "download now" button 134, indicating the desired action to which the cost-per-action constraint for the content applies (e.g., the cost-per-action constraint indicates a target or maximum cost of $3 per downloaded app, etc.) The content delivery server 170 may send or may initiate sending of the first candidate content 132 to the user device 110 for presentation or rendering at the available content delivery slot 130. The user device 110 may receive the first candidate content 132, or a content identifier associated with the first candidate content 132, and may render the first candidate content 132. The first candidate content 132 may include the button 134 that may facilitate download of the application, or the interaction desired by the content creator. The first candidate content 132 may be any suitable digital content. The user may interact with the presented content impression of the first candidate content 132. For example, the user may select the button 134.

When or after the first candidate content 132 is rendered, a determination may be made as to whether the user interacted with the first candidate content 132. The determination may be made locally, for example via execution of JavaScript or other computer-executable instructions at the user device 110, via the content delivery server 170, via a combination of the content delivery server 170, or via another computer system. At block 182 of the process flow, computer-executable instruction may be executed to detect user interaction. In one example, the user device 110 may determine whether the user interacted with the first candidate content 132. The user device 110 may determine that the user selected the button 134 via a display of the user device 110. In another example, a conversion or tracking pixel may be used to determine conversion. In some embodiments, determinations may be made at the content delivery server 170 instead of at the user device 110. For example, the user device 110 may be under the control of the content delivery server 170, or may send information to the content delivery server 170 in order to determine whether the user consumed the first candidate content 132. In one example, user behavior may be monitored, by the user device or by a remote server, to determine the occurrence of a conversion event.

In FIG. 1, the user device 110 may determine that the user interacted with the first candidate content 132. A second user interface 140 with additional information or a download status may be presented. The second user interface 140 may include a conversion pixel in some embodiments. The user device 110 may detect a selection of the button 134 at the first user interface 100. The user device 110 may send an interaction confirmation notice at operation 150 to the content delivery server 170 via one or more networks 160. The one or more networks 160 may be wired or wireless networks, or a combination thereof. The viewed confirmation notice may indicate whether or not the user interacted with the first candidate content 132.

At block 184 of the process flow of FIG. 1, the content delivery server 170 may determine that the user interacted with the first candidate content 132. For example, the content delivery server 170 may receive the interaction notification from the user device 110, or the content delivery server 170 may make a determination that the user interacted with the content based at least in part on information received from the user device 110 or another computer system.

At block 186, a cost-per-action constraint error term may be updated based at least in part on the user interaction. The error term may be a shadow price and may indicate a difference between the cost-per-action constraint value and the actual or current cost per action associated with the campaign. For example, the cost of delivering the first candidate content 132 may be added to an aggregate or total cost spent on delivering impressions for the entire content delivery campaign, and may be divided by the total number of completed actions (which may be in response to delivered impressions) to arrive at an aggregate or average cost per action for the content delivery campaign. A difference between the average cost per action and the cost-per-action constraint may be used to determine the error term. Error term may be based at least in part on the probability of conversion, an estimated revenue from serving an impression, and the cost-per-action constraint. The error term may represent how far off from the cost-per-action target we are and/or what are the incremental contributions of winning one impression at this particular instant. In one implementation, embodiments of the disclosure may generate bids that are relatively high for relatively cheap impressions that are likely to lead to conversions, and generate bids that are relatively low for relatively expensive impressions which are unlikely to lead to conversions. In some embodiments, the bid modifier may be determined by multiplying the error term by the shadow price. The shadow price may account for time set error.

In some embodiments, the predictive conversion rate algorithm may be updated based at least in part on the interaction notification, or the confirmation that the user interacted with the content. The predictive conversion rate algorithm may be updated periodically, such as every 20 seconds, or at predetermined time intervals. Updates to the predictive conversion rate algorithm may be implemented based at least in part on machine learning techniques. Updates may be based at least in part on batched data, such as based viewing data. For example, interaction confirmations or notifications over a period of 20 seconds may be compared to estimated or predicted conversion rates for those respective content delivery slots to determine an accuracy of the predictive conversion rate algorithm(s). The predictive conversion rate algorithm(s) may be updated to improve accuracy based at least in part on the performance of the algorithm(s) over the prior time interval or time period. For example, if the predicted conversion rate for available content delivery slots was 100% accurate, the predictive conversion rate algorithm(s) may not be modified, whereas if the accuracy was low, updates may be implemented using machine learning techniques to improve the accuracy. Over time in an iterative process, the predictive conversion rate algorithm(s) may converge to accurately predict whether or not a user will interact with certain content.

Upon determining that the user consumed the first candidate content 132, the cost-per-action constraint status for the campaign associated with the first candidate content 132 may be updated. For example, if the cost to serve the first candidate content 132 impression was $2.99, the cost may be factored into the average cost per action for the campaign. The average cost may be compared to the cost-per-action constraint and may be used for future bid modifiers and/or bidding strategies for content associated with the campaign.

By determining whether or not content was interacted with by a user, embodiments of the disclosure may provide the ability to implement and satisfy cost-per-action constraints, which may enable content creators or other users to execute effective campaigns and improve content campaign performance. Embodiments of the disclosure may further optimize content delivery campaign performance via the use of bid modifiers that may be determined based at least in part on a predicted conversion rate for a particular bid request and/or for particular content.

The systems, methods, computer-readable media, techniques, and methodologies for detecting user interactions and delivering content using interaction metrics may result in improved control and effectiveness of content delivery campaigns, as well as improved and efficient use of computer resources and other allocated resources.

Example embodiments of the disclosure provide a number of technical features or technical effects. For example, in accordance with example embodiments of the disclosure, certain embodiments of the disclosure may generate predictive conversion rates and may generate binary determinations as to whether content will be interacted with if presented. As a result, content delivery may be managed more effectively and computer resources may be utilized more efficiently, due to easier disposition of content in response to bid requests. Embodiments of the disclosure may automatically execute or cause execution of logic at user devices to make determinations of whether content was interacted with, which may not require active user interaction. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
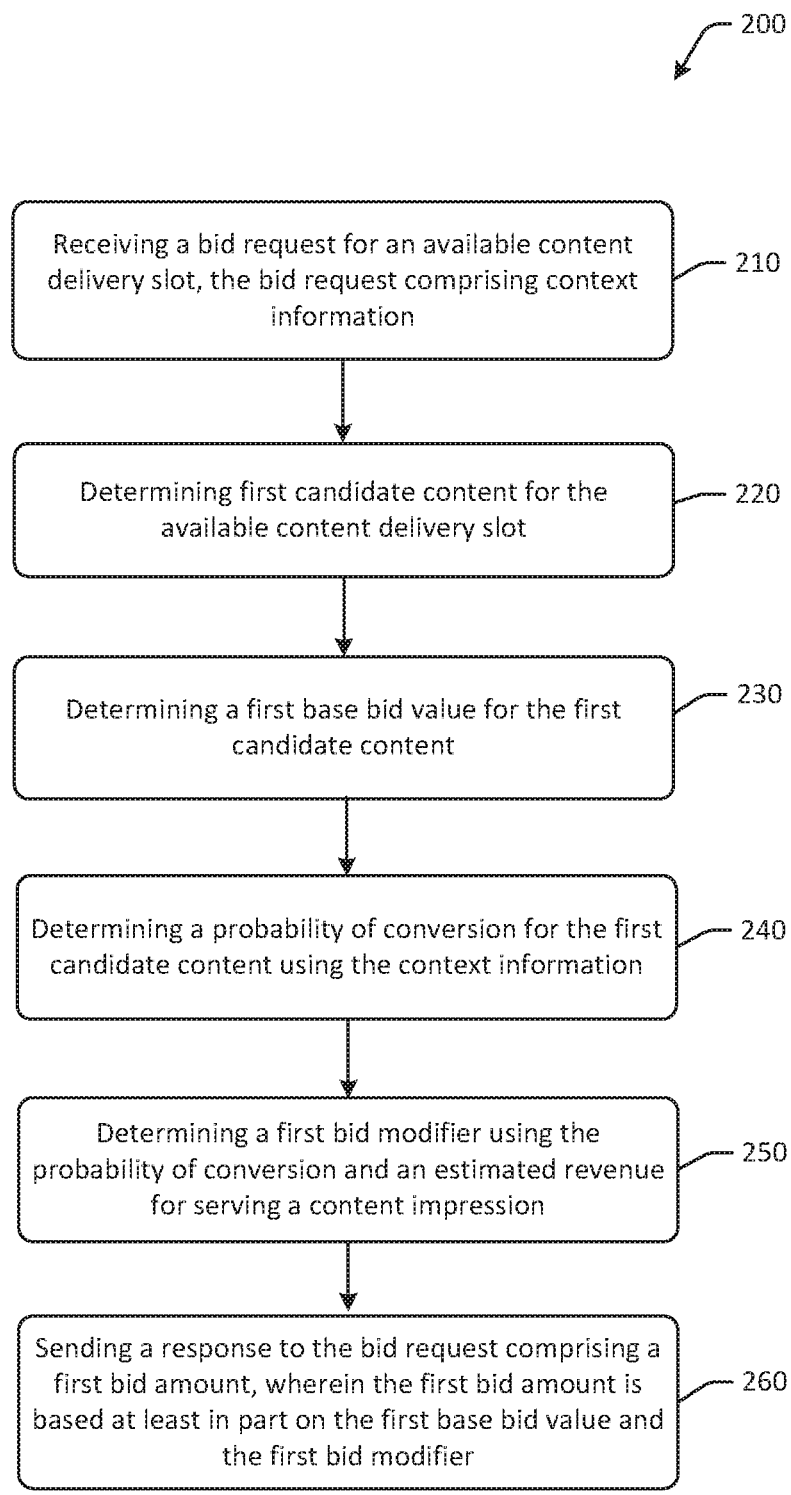
FIG. 2 is an example process flow diagram for detecting user interactions and delivering content using interaction metrics in accordance with one or more embodiments of the disclosure.

Referring to FIG. 2, an example process flow 200 for detecting user interactions and delivering content using interaction metrics in accordance with one or more embodiments of the disclosure is depicted. Although certain operations are illustrated as occurring separately in FIG. 2, some or all of the operations may occur concurrently or partially concurrently across one or more computer systems.

At block 210 of the process flow 200, a bid request for an available content delivery slot is received, the bid request comprising context information. For example, computer-executable instructions of one or more content delivery module(s) stored at a remote server may be executed to receive a bid request for an available content delivery slot. The bid request may include information related to the specific available content delivery slot, such as information related to the user to which the content impression will be served, website content or context, location information, chronological information, and other related information.

At block 220, first candidate content for the available content delivery slot is determined. For example, computer-executable instructions of one or more content delivery module(s) stored at a remote server may be executed to determine candidate content for the available content delivery slot. Candidate content may be selected from available content. Candidate content may include content available to the server for which the server may serve content impressions. In some embodiments, candidate content may be determined by determining targeting criteria for available content, and determining which of the available content has targeting criteria that is satisfied by the bid request. A remote server may determine that the first candidate content has targeting criteria that is satisfied by the bid request, and thus, the content is the first candidate content.

At block 230, a first base bid value for the first candidate content is determined. For example, computer-executable instructions of one or more content delivery module(s) stored at a remote server may be executed to determine a base bid value for the first candidate content. Base bid values may be determined by determining an expected value that may be received from presenting a content impression at the available content delivery slot. Expected value may be a dollar value that may be received from serving one impression of particular content. To generate or determine a base bid value, information associated with a determined quality or value of the available content delivery slot, and/or information relating to metrics or historical data associated with content that has previously been served (e.g., click-through rate, number of clicks, number of impressions, number of page views, number of associated searches, etc.) may be considered. Additional considerations in generating bid values may include bid data such as previous and/or most recent winning bid values for particular content, and/or a period of time that has elapsed since the most recent winning bid. Historical bid information may further include aggregate bid information relating to each bid value previously submitted for content regardless of whether the bid was a winning bid. Base bid values may be determined for each candidate content.

At block 240, a probability of conversion for the first candidate content is determined using the context information. For example, computer-executable instructions of one or more predictive conversion rate determination module(s) stored at a remote server may be executed to determine an estimated or predicted conversion rate, or a probability of conversion, based at least in part on the context information and/or the bid request. In some embodiments, the probability of conversion may be a probability that a user will interact with a content impression. The context information may indicate user attributes, geographic location, and other information that may be used to determine a probability that the user will interact with particular content. In some embodiments, content specific information may be used to determine the probability, such as targeting criteria, user preferences, and the like. The probability of conversion may be binary in that the outcome of the determination is positive or negative, or may be a numerical value that is converted to a binary value. For example, probabilities at or above a certain threshold value may be converted to positive determinations, while probabilities at or below a certain threshold may be converted to negative determinations. In some embodiments, the probability may be determined as a numerical value. A probability of conversion or an estimated conversion rate may be determined for a bid request and applied to all candidate content, or may be determined individually for each candidate content.

Probability of conversion or probability of action may be the probability that serving one impression of an ad for a given bid request or user will lead to a conversion or a click or other desired action. Probabilities may be determined, for example, by logistic regressions, redundancy models, or other models. The models used to determine probability may consider several inputs, including user-specific information (e.g., demographic, purchase history, etc.), context information (e.g., time of day, website content, keywords, etc.). Certain embodiments may dynamically weight inputs of a probability model based on factors other than user-specific features. For example, a previous determination that a user is in the market to purchase electronics may not change hourly, and therefore, some probability models implemented by servers described herein may cache pre-calculated user information or analysis of user information, such that an ad server does not have to calculate user-specific information or make related determinations in real-time in response to a bid request.

At block 250, a first bid modifier is determined using the probability of conversion and an estimated revenue for serving a content impression. For example, computer-executable instructions of one or more content delivery module(s) stored at a remote server may be executed to determine a bid modifier for the first candidate content. Bid modifiers may be determined based at least in part on one or more of a target cost per action, estimated conversion rates, estimated costs associated with delivery of a content impression at an available content delivery slot, estimated revenue from delivery of a content impression, and/or another metric. For example, an estimated revenue associated with delivery of a content impression at the available content delivery slot may be determined and used to determine a bid modifier.

The bid modifier may be a positive or negative value that may be determined based at least in part on the predicted or estimated view rate. In one example, the first bid modifier may be a function of the shadow price for the first candidate content. The bid modifier may be used to modify or adjust the base bid values for the candidate content to generate adjusted or modified base bid values. The modified base bid values may be bid amounts that may be submitted for respective content in response to the bid request.

At block 260, a response to the bid request is sent, where the response includes a first bid amount that is based at least in part on the first base bid value and the first bid modifier. For example, computer-executable instructions of one or more content delivery module(s) stored at a remote server may be executed to determine the first bid amount by adding, subtracting, or otherwise combining the base bid value and the bid modifier to determine a first bid amount, and submitting the first bid amount in response to the bid request. In some embodiments, a ranking process may be completed to determine candidate content associated with the highest adjusted bid value in order to determine for which candidate content a bid should be submitted. In this example, the first candidate content may have the highest adjusted bid value, and a response to the bid request for the first candidate content may therefore be submitted.

Figure 3:
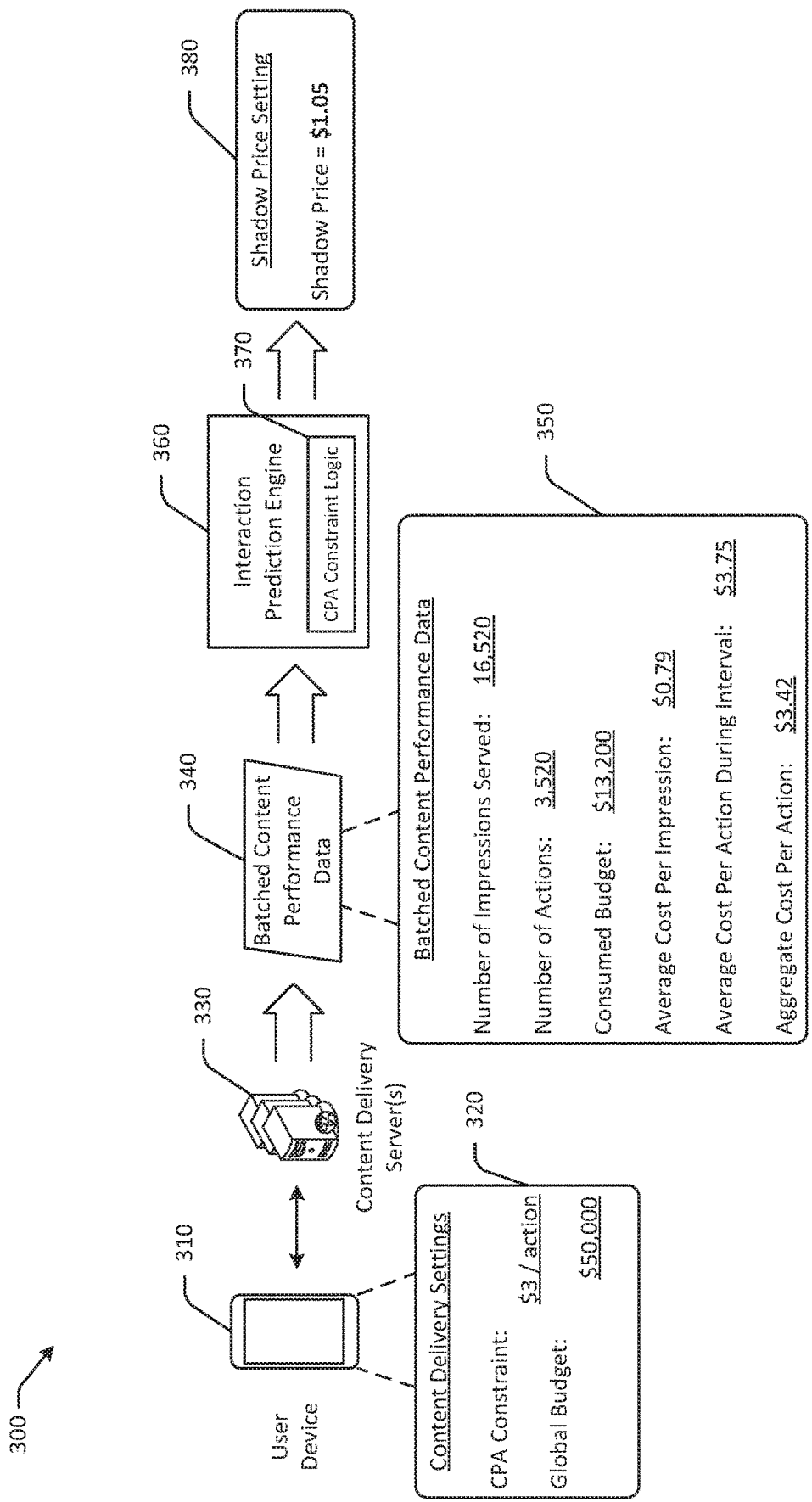
FIG. 3 is an example hybrid system and process flow diagram for determining predictive conversion rates in accordance with one or more embodiments of the disclosure.

FIG. 3 depicts an example hybrid system and process flow diagram 300 for determining predictive interaction rates in accordance with one or more embodiments of the disclosure. In FIG. 3, a user, such as a campaign manager, a content creator or provider, or another party, may initiate or set up a content delivery campaign using a user device 310. The content delivery campaign may include content delivery parameters or settings 320. The content delivery settings 320 may indicate a cost-per-action constraint, such as a target or maximum cost of $3 per action. The cost-per-action constraint may indicate a value that the user wishes to pay, or a maximum value that the user does not wish to exceed, per desired action for an impression of content associated with the content delivery campaign. Desired actions may include, but are not limited to, clicks, views, downloads, purchases, and other actions. The content delivery settings 320 may include additional settings, such as pacing constraints, budget constraints, and other settings. For example, a global budget of $50,000 may be set for the campaign.

The content delivery settings 320 may be communicated to one or more content delivery servers 330. The content delivery server 330 may determine the content campaign delivery parameters and the cost-per-action constraint for the content delivery campaign, where the cost-per-action constraint represents a target cost per action. The content delivery server 330 may initiate delivery of content associated with the content delivery campaign as the campaign is initiated. To deliver impressions of the content for the content delivery campaign, an auction process may be conducted. The content delivery server 330 may receive a bid request for an available content delivery slot. The content delivery server 330 may be one of many servers that receive a bid request for the available content delivery slot. The bid request may include context information. The content delivery server 330 may determine candidate content for the available content delivery slot. For example, the content delivery server 330 may determine a set of one or more candidate content for the available content delivery slot. The set of candidate content may include first candidate content and second candidate content. The first candidate content may be content associated with the content delivery campaign in FIG. 3. The content delivery server 330 may generate base bid values for one or more, or each, of the set of candidate content. For example, the content delivery server 330 may determine a first base bid value for the first candidate content and a second base bid value for the second candidate content. The base bid values may be based at least in part on an expected value associated with the respective candidate content. The content delivery server 330 may determine bid modifiers for one or more, or each, of the candidate content. For example, the content delivery server 330 may determine that the first candidate content is associated with a content delivery campaign having a cost-per-action constraint. The bid modifier for the first candidate content may therefore be based at least in part on a predicted interaction rate (e.g., a probability that a user will interact with the content impression if served, etc.) for the first candidate content, and/or may be based at least in part on the current status of the campaign with respect to the cost-per-action constraint.

The content delivery server 330 may determine a predicted interaction rate indicative of a likelihood that the user will interact with the content impression if presented at the available content delivery slot. The predictive interaction rate may be determined by one or more predictive interaction/conversion rate algorithms. The predictive interaction rate may be used to determine the bid modifier.

The content delivery server 330 may determine a status of the campaign with respect to the cost-per-action constraint. For example, the content delivery server 330 may determine how far off the current average cost per action is from the target cost or maximum cost per action as defined by the cost-per-action constraint. For example, the content delivery server may determine a difference between an average cost per action for the content delivery campaign and the target cost per action. The bid modifier for the first candidate content may be based at least in part on the difference between the average and the target, as well as the predicted interaction rate.

The predictive interaction rate algorithm may be updated periodically or after a predetermined time interval has elapsed. Updates may include content impression performance, such as information related to whether or not specific content was consumed. Such information may be used to improve the predictive interaction rate algorithm via machine learning techniques.

In FIG. 3, the content delivery server 330 may determine that the adjusted bid value for the first candidate content is the highest adjusted bid value in a ranking process that ranks candidate content by adjusted bid value. The content delivery server 330 may submit a response to the bid request with the adjusted bid value for the first candidate content, and if the bid is a winning bid, the content delivery server 330 may facilitate delivery of an impression of the first candidate content in the available content delivery slot.

The predictive interaction rate algorithm used to determine a predicted interaction or conversion rate for a given content delivery slot may be modified using data. Modifications or updates to the predictive interaction rate algorithm may be implemented as data becomes available, such as in real-time, periodically, or after a predetermined time interval has elapsed. For example, in FIG. 3, viewed impression data may be batched as batched content performance data 340. The batched content performance data may include data 350 related to a number of impressions served during a time interval, a number of desired actions that were completed, a consumed budget over the time interval, an average cost per impression, an average cost per action over the time interval, an aggregate cost per action over the entire campaign, and other data. For example, the average cost per action during a time interval may be $3.75, and the aggregate cost per action during the entire campaign may be $3.42, both of which may be greater than the cost-per-action constraint of $3 per action. The batched content performance data 350 may be used to determine error terms and/or shadow prices.

The batched content performance data 350 may be communicated to an interaction prediction engine 360 that may utilize cost-per-action constraint logic 370, which may include predictive interaction rate algorithms, to determine predicted interaction rates. The interaction prediction engine 360 may modify or update the predictive interaction rate algorithm based at least in part on the batched content performance data 350, so as to increase accuracy of the predicted interaction rates generated by the interaction prediction engine 360. The predictive interaction rate engine 360 may also generate a shadow price setting 380 for the respective content. For example, the shadow price setting for the first candidate content may be −$1.05, which may reflect the fact that the aggregate cost per action does not satisfy the cost-per-action constraint (e.g., $3.42 is greater than the target of $3), and as a result, bid values for the first candidate content should be adjusted downwards. The shadow price settings, which may be a positive or negative value, may be entered or represented as an absolute value, as shown in FIG. 3, or may be represented with a negative sign or other indicator of negative value in some embodiments. Bid modifiers may be determined based at least in part on shadow prices for respective content campaigns, as well as predicted view rates, in some embodiments.

Figure 4:
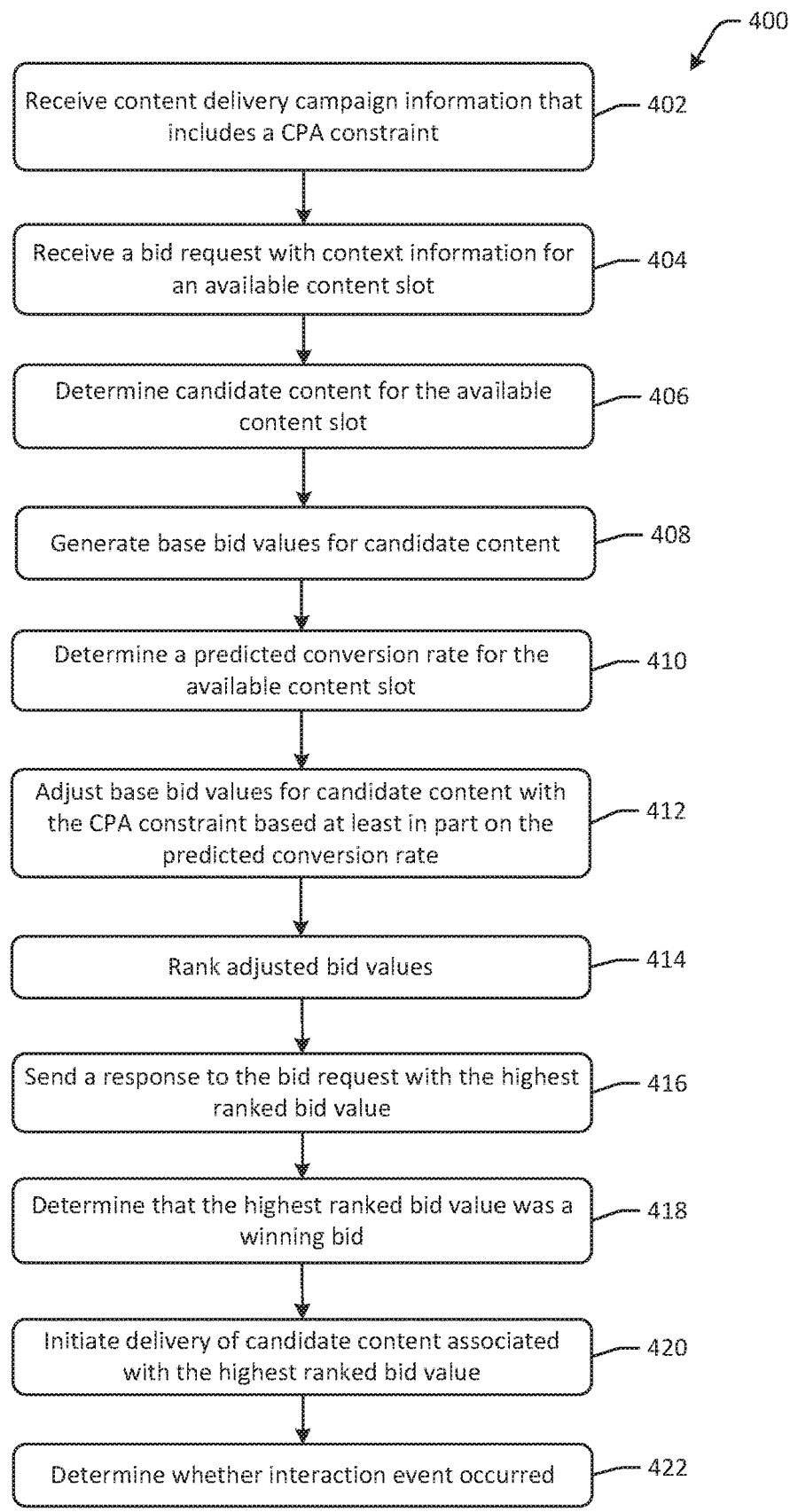
FIGS. 4-5 are example process flow diagrams for detecting user interactions and delivering content using interaction metrics in accordance with one or more embodiments of the disclosure.

FIG. 4 depicts an example process flow 400 for detecting user interactions and delivering content using interaction metrics in accordance with one or more embodiments of the disclosure. At block 402, a content delivery server may receive content delivery campaign information that includes a cost-per-action constraint. A content creator or campaign manager may indicate a cost-per-action constraint with a target or maximum cost per action that is to be implemented during delivery of content associated with a content campaign.

At block 404, the content delivery server may receive a bid request with context information for an available content slot. The bid request may request a bid for the available content slot. The context information may include information related to the available content slot, the user device at which the content impression is to be presented, user information, and/or other contextual information.

At block 406, the content delivery server may determine candidate content for the available content slot. Candidate content may be determined from available content and may be based at least in part on attributes of the available content slot, and the context information.

At block 408, the content delivery server may generate base bid values for the candidate content. Base bid values may be determined based at least in part on an expected value and/or shadow price for respective candidate content.

At block 410, the content delivery server may determine a predicted conversion rate for the available content slot. The predicted conversion rate may be specific to each candidate content, or may be specific to the bid request and/or the available content slot. The predicted conversion rate may be determined by a predictive conversion rate algorithm and/or interaction prediction engine indicative of a likelihood that a user will interact with content presented at the available content slot.

At block 412, the content delivery server may adjust base bid values for candidate content associated with the cost-per-action constraint based at least in part on the predicted conversion rate. The base bid value for the candidate content associated with the cost-per-action constraint may be adjusted by a bid modifier. The bid modifier may be an amount by which the base bid value is adjusted. The bid modifier may be determined based at least in part on the predicted conversion rate, an estimated cost associated with delivering a content impression at the available content slot, an estimated revenue associated with delivery of the impression, and/or the bid request and context information. Candidate content that is not associated with the cost-per-action constraint may also be adjusted or modified in accordance with other constraints that may be applicable to the respective candidate content. In one example, the content delivery server may determine an estimated conversion rate using at least the context information, and may determine a first bid modifier using the estimated conversion rate.

At block 414, the content delivery server may rank the adjusted bid values. The adjusted bid values may be ranked in order to determine a highest adjusted bid value. The highest adjusted bid value may be determined to be a highest ranked bid value.

At block 416, the content delivery server may send a response to the bid request with the highest ranked bid value. At block 418, the content delivery server may determine that the highest ranked bid value was a winning bid. At block 420, the content delivery server may initiate delivery of the candidate content associated with the highest ranked bid value. At block 422, the content delivery server may determine whether an interaction event occurred after the content impression was served. Interaction events may be any desired action, such as a user click-through, a purchase, a download, etc. The content delivery server may make the determination or may receive an indication from a user device.

Figure 5:
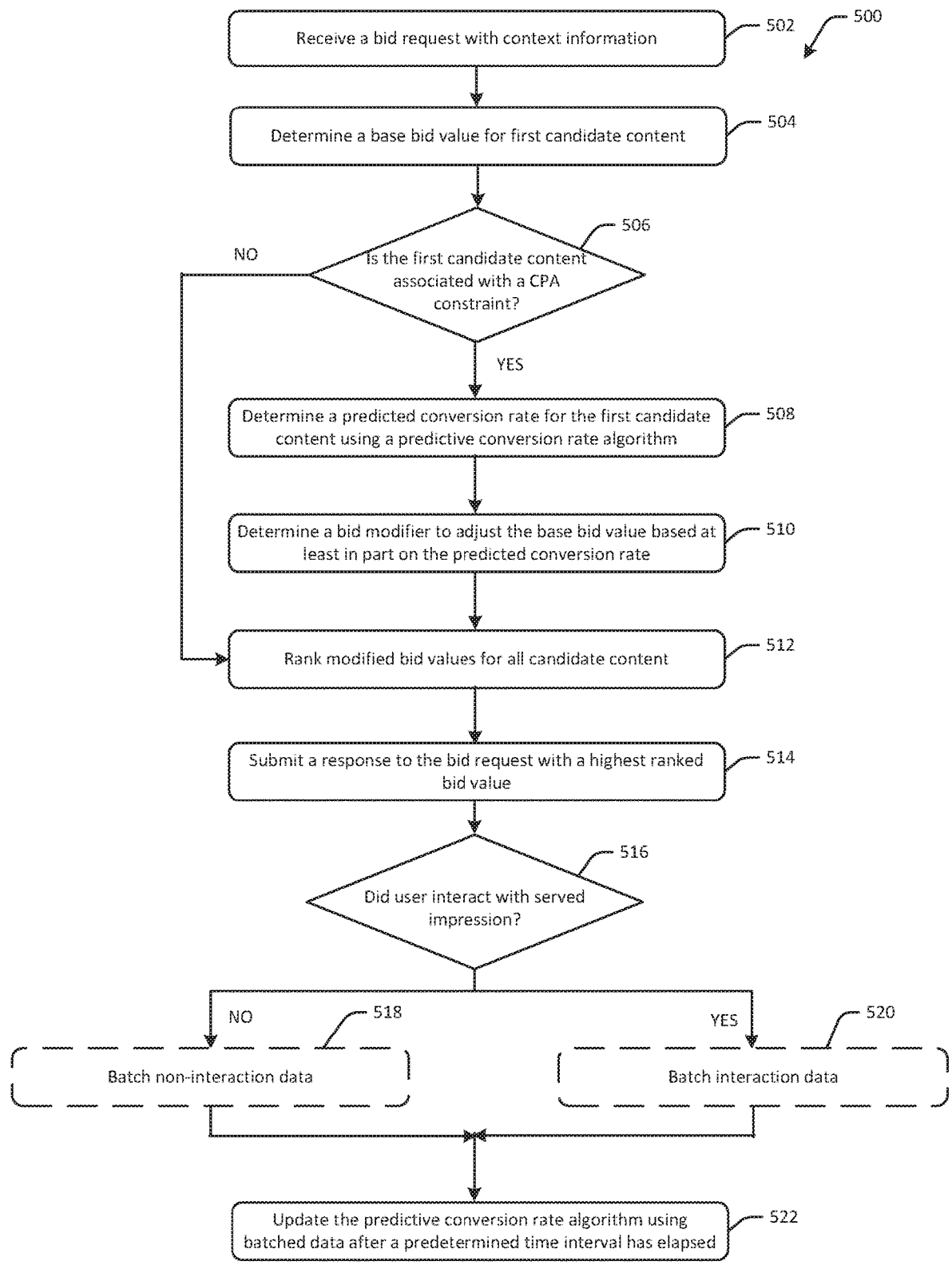

FIG. 5 depicts an example process flow 500 for detecting user interactions and delivering content using interaction metrics in accordance with one or more embodiments of the disclosure. At block 502 of the process flow 500, a bid request is received with context information. The bid request may be received by one or more computer systems. The bid request may be received by one or more content delivery servers(s). The content delivery servers may determine eligible content or candidate content in response to the bid request. For example, first candidate content may be determined to be eligible for an available content slot for which the bid request was received. Eligibility may be determined, for example, based on factors such as attributes of the available content slot, device properties, context, or other factors.

At block 504, a base bid value is determined for the first candidate content. The base bid value may be determined based at least in part on an expected value of presenting an impression of the first candidate content at the available content slot.

At determination block 506, a determination is made as to whether the first candidate content is associated with a cost-per-action constraint. The determination may be made, for example, by a content delivery module stored at the content delivery server. If it is determined that the first candidate content is associated with a cost-per-action constraint, the process flow 500 may continue to block 508, at which a predicted conversion rate and/or a probability that the first candidate content will be interacted with by a user is determined using one or more predictive conversion rate algorithms. At block 510, a bid modifier to adjust the base bid value is determined based at least in part on the predicted conversion rate. The process flow 500 may then proceed to block 512.

If it is determined at determination block 506 that the first candidate content is not associated with a cost-per-action constraint, the process flow 500 may proceed to block 512. At block 512, modified bid values for all candidate content may be ranked. Certain content may be associated with different delivery constraints and may be modified or adjusted accordingly. In some instances, not all bids for candidate content may be modified; in such cases the base bid values for non-modified bids may be ranked together with the modified bid values.

At block 514, a response to the bid request may be submitted with a highest ranked bid value. The highest ranked bid may be determined to be associated with the first candidate content. The response to the bid request may include an identifier associated with the first candidate content.

The highest ranked bid as submitted in the response may be determined to be a winning bid. For example, the content delivery server may receive a winning bid notification. As a result, delivery of the first candidate content may be facilitated. For example, creative material associated with the first candidate content may be sent to a user device for presentation at the available content slot.

At determination block 516, a determination is made as to whether a user interacted with the served impression. The determination may be made, for example, by an interaction detection module stored at a remote server. The determination may be made at the user device, at a remote server, or by a combination of computer resources thereof. In one example, the determination may be based at least in part on a user action at the user device, such as interaction with the content impression or with the user device. In some embodiments, a remote server may initiate execution of computer-executable instructions at a user device to determine occurrence of an interaction event after the content impression is rendered at the user device. The user device may receive an interaction notification from the user device indicating that the user consumed the content.

If it is determined that the user did not interact with the content at determination block 516, the process flow 500 may proceed to optional block 518, at which non-interaction data may be batched. For example, for all impressions associated with a campaign during a certain time interval, non-interaction data (such as data indicating that an impression was not interacted with) may be batched and stored. If it is determined at determination block 516 that the user did interact with the content, the process flow 500 may proceed to optional block 520, at which interaction data may be batched. For example, for all impressions associated with a campaign during a certain time interval, interaction data (such as data indicating that an impression was interacted with) may be batched and stored.

At block 522, the predictive conversion rate algorithm may be updated or modified using the batched data after a predetermined time interval has elapsed. For example, every 20 seconds, the predictive conversion rate algorithm may be updated via machine learning techniques based at least in part on the batched data. The predictive conversion rate algorithm may be used to determine predictive conversion rates for subsequent bid requests.

Figure 6:
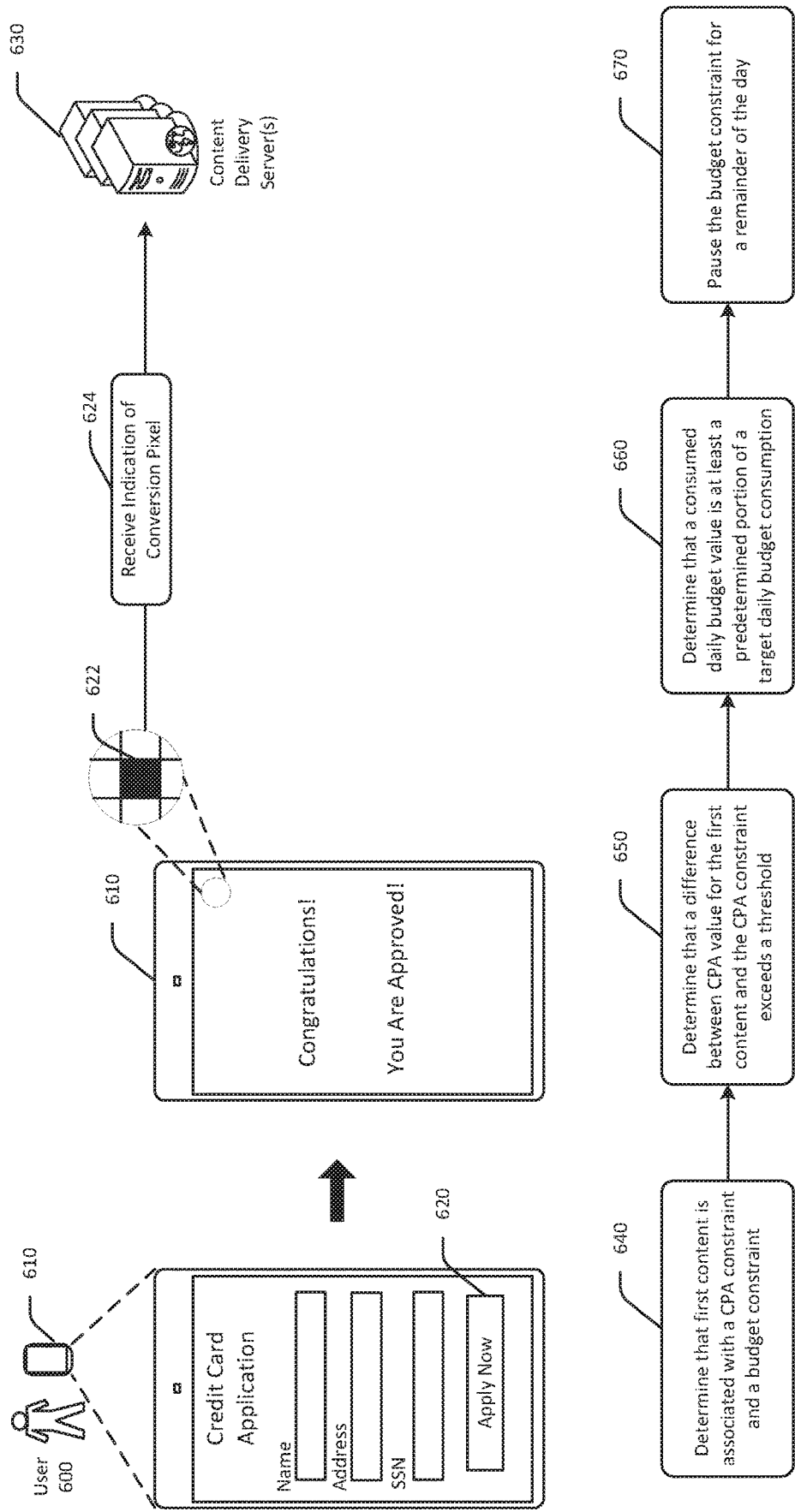
FIG. 6 is an example hybrid system and process flow diagram for detecting user interactions and delivering content using interaction metrics in accordance with one or more embodiments of the disclosure.

FIG. 6 schematically illustrates an example pixel conversion interaction use case for detecting user interaction and delivering content using interaction metrics in accordance with one or more embodiments of the disclosure. In FIG. 6, an example pixel conversion use case is depicted, including a user 600 with a user device 610 in communication with one or more content delivery server(s) 630 via one or more networks. The user 600 may view, consume, or otherwise interact with digital content 620 on a display of the user device 610. The digital content 620 may be a credit card application. While consuming the digital content 620, or while filling out the credit card application, the user 600 may interact with one or more elements of the digital content 620. An interaction history of the user 600 may be monitored and/or stored or otherwise tracked. The interaction history may be associated with a user identifier that is associated with the user 600 and/or the user device 610. The interaction history may be used to determine that the user 600 performed a desired action that corresponds to an action related to a cost-per-action constraint. In FIG. 6, the user 600 may complete the credit card application and may submit the application.

The user 600 may be approved for the credit card and may be presented with an approval user interface. The approval user interface may indicate to the user 600 that the credit card application submitted by the user 600 has been approved for the credit card. The approval user interface may include a conversion pixel 622 that is presented at the user device 610. The conversion pixel 622 may trigger sending of, or may send, a signal or indication to the content delivery server 630 that the conversion pixel 622 has been rendered. At operation 624, the content delivery server 630 may receive an indication of the conversion pixel.

Upon receiving the indication that the conversion pixel 622 has been rendered, the content delivery server 630 may determine that the user 600 was approved for the credit card. Because a location of the conversion pixel 622 may be known (e.g., the conversion pixel is located at a particular user interface, such as the approval user interface), the content delivery server 630 may determine that the user 600 was approved. If the conversion pixel were placed elsewhere, such as at the digital content 620 interface, the remote server(s) 630 may only determine that the user 600 wanted to fill out a credit card application.

To deliver the digital content 620, at operation 640 the content delivery server 630 may determine that first content, which may be the digital content 620 in FIG. 6, is associated with a cost-per-action constraint and is also associated with a budget constraint. For example, the digital content 620 may be associated with a campaign having a cost-per-action constraint of $5 per action and a budget constraint of $10,000 spent per day.

At operation 650, the content delivery server 630 may determine that a difference between a cost-per-action value for the first content and the cost-per-action constraint exceeds a threshold. For example, a current cost-per-action value for the digital content 620 may be $7 per action, such that a difference between the cost-per-action value of $7 and the cost-per-action constraint of $5 is $2. The $2 difference may exceed a threshold of, for example, $1.50.

At operation 660, the content delivery server 630 may determine that a consumed daily budget value is at least a predetermined portion of a target daily budget consumption. For example, the day the digital content 620 is presented in the example of FIG. 6, a consumed daily budget value may be $7,800. In other words, $7,800 may have been spent on delivering impressions of content associated with the campaign on that day. The $7,800 consumed daily budget may be equal to or greater than at least a predetermined portion, such as a fraction, a percentage, or another portion, such as 75% of the target daily budget consumption, which may be $10,000, as indicated by the budget constraint. Because at least the predetermined portion of the target daily budget consumption has been spent, a certain number of impressions may have been delivered. Other embodiments may use a number of impressions delivered, or a number of actions detected, or other metrics instead of, or in addition to, the consumed daily budget.

At operation 670, the content delivery server 630 may pause or otherwise temporarily override the budget constraint for a remainder of the day. When the budget constraint is paused, the target daily budget consumption may not be in effect, such that the target daily budget consumption can be exceeded or not met. By pausing or temporarily overriding the budget constraint, the content delivery server 630 can implement a bidding strategy to bring the average cost-per-action value closer to the cost-per-action constraint. After the day is over, the budget constraint may be unpaused or reinstituted.

Campaign delivery constraints can be prioritized based at least in part on campaign performance, such as a number of served impressions or a number of actions, campaign manager input, user information, or other factors.

One or more operations of the method, process flows, or use cases of FIGS. 1-6 may have been described above as being performed by a user device, or more specifically, by one or more program module(s), applications, or the like executing on a device. It should be appreciated, however, that any of the operations of methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
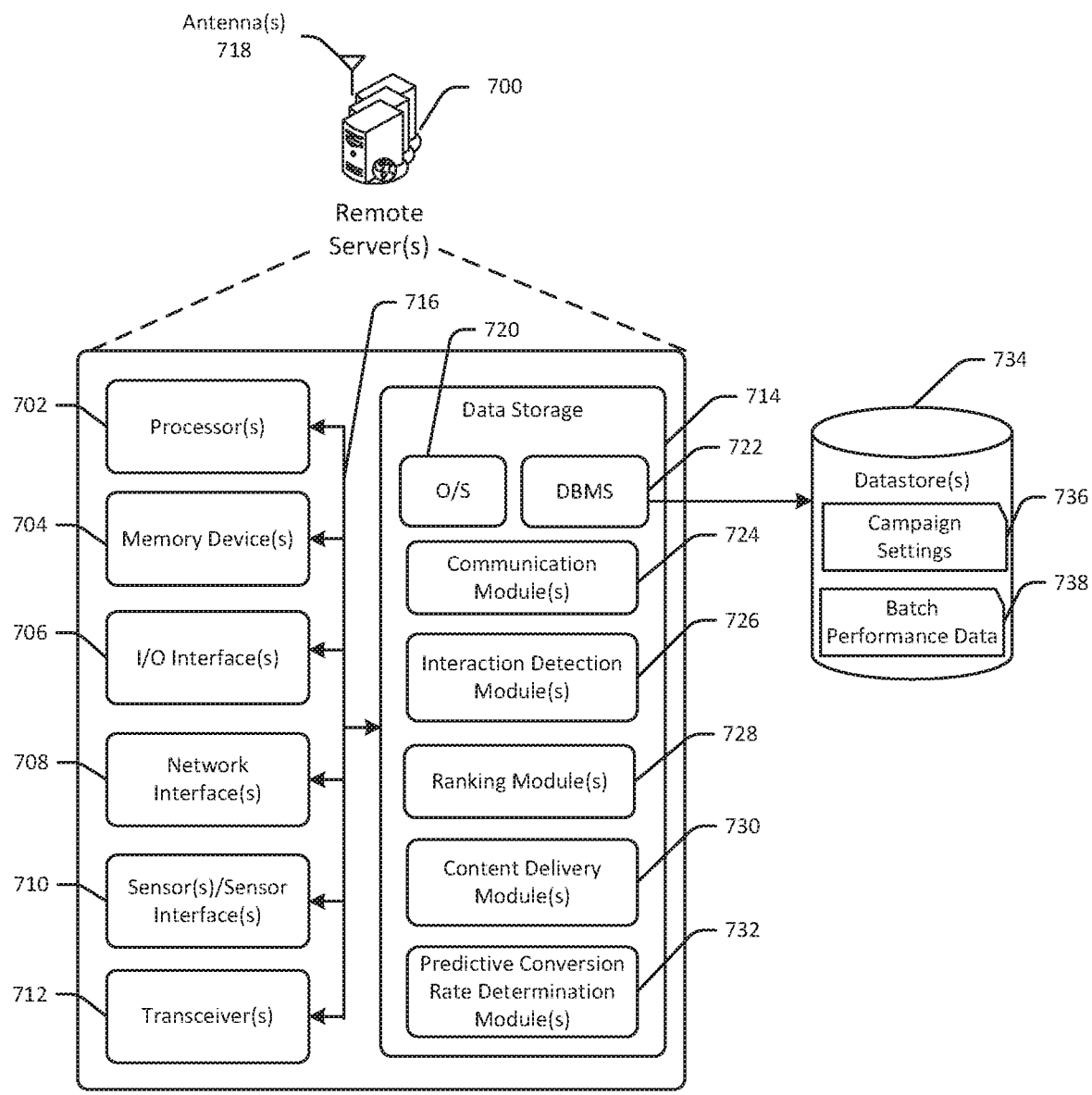
FIG. 7 schematically illustrates an example architecture of a system in accordance with one or more embodiments of the disclosure.

FIG. 7 is a schematic block diagram of one or more illustrative remote server(s) 700 in accordance with one or more example embodiments of the disclosure. The remote server(s) 700 may include any suitable computing device including, but not limited to, a server system, a mobile device such as a smartphone, tablet, e-reader, wearable device, or the like; a desktop computer; a laptop computer; a content streaming device; a set-top box; or the like. The remote server(s) 700 may correspond to an illustrative device configuration for the campaign management servers of FIGS. 1-6.

The remote server(s) 700 may be configured to communicate via one or more networks with one or more servers, user devices, or the like. The remote server(s) 700 may be configured to actively or passively manage one or more aspects of a content campaign, such as content delivery parameters. The remote server(s) 700 may be configured to deliver one or more pieces of content and may further be configured to engage in a bidding process for auctions to present content. In some embodiments, a single remote server or single group of remote servers may be configured to perform more than one type of content delivery functionality.

The remote server(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server(s) 700 may include one or more processors (processor(s)) 702, one or more memory devices 704 (generically referred to herein as memory 704), one or more input/output ("I/O") interface(s) 706, one or more network interface(s) 708, one or more sensors or sensor interface(s) 710, one or more transceivers 712, and data storage 714. The remote server(s) 700 may further include one or more buses 716 that functionally couple various components of the remote server(s) 700. The remote server(s) 700 may further include one or more antenna(e) 718 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 716 may include at least one of a system bus, a memory bus, an address bus, or a message bus, and may permit exchange of information (e.g., data (including computer-executable code), signaling, etc.) between various components of the remote server(s) 700. The bus(es) 716 may include, without limitation, a memory bus or a memory controller, a peripheral bus, an accelerated graphics port, and so forth. The bus(es) 716 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the remote server(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 714 may include removable storage and/or non-removable storage including, but not limited to, magnetic storage, optical disk storage, and/or tape storage. The data storage 714 may provide non-volatile storage of computer-executable instructions and other data. The memory 704 and the data storage 714, removable and/or non-removable, are examples of computer-readable storage media (CRSM) as that term is used herein.

The data storage 714 may store computer-executable code, instructions, or the like that may be loadable into the memory 704 and executable by the processor(s) 702 to cause the processor(s) 702 to perform or initiate various operations. The data storage 714 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 714 for non-volatile storage.

More specifically, the data storage 714 may store one or more operating systems (O/S) 720; one or more database management systems (DBMS) 722; and one or more program module(s), applications, engines, computer-executable code, scripts, or the like such as, for example, one or more communication module(s) 724, one or more interaction detection module(s) 726, one or more ranking module(s) 728, one or more content delivery module(s) 730, and/or one or more predictive conversion rate determination module(s) 732. Some or all of these module(s) may be sub-module(s). Any of the components depicted as being stored in data storage 714 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 714 may support functionality described in reference to correspondingly named components earlier in this disclosure.

The data storage 714 may further store various types of data utilized by components of the remote server(s) 700. Any data stored in the data storage 714 may be loaded into the memory 704 for use by the processor(s) 702 in executing computer-executable code. In addition, any data depicted as being stored in the data storage 714 may potentially be stored in one or more datastore(s) and may be accessed via the DBMS 722 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, an example datastore(s) 734 may include, for example, campaign settings 736, batch performance data 738, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the remote server(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the communication module(s) 724 may include computer-executable instructions, code, or the like that responsive to execution by one or more of the processor(s) 702 may perform functions including, but not limited to, communicating with remote servers, communicating with remote datastores, sending or receiving notifications, and the like.

The interaction detection module(s) 726 may include computer-executable instructions, code, or the like that responsive to execution by one or more of the processor(s) 702 may perform functions including, but not limited to, determining whether a content impression was served, determining whether a content impression was viewed or interacted with, determining conversion events, determining pixel location of served content, initiating computer-executable logic at user devices or other remote devices, and the like.

The ranking module(s) 728 may include computer-executable instructions, code, or the like that responsive to execution by one or more of the processor(s) 702 may perform functions including, but not limited to, determining base bid values, determining bid modifiers, determining viewability constraint statuses, and the like.

The content delivery module(s) 730 may include computer-executable instructions, code, or the like that responsive to execution by one or more of the processor(s) 702 may perform functions including, but not limited to, identifying applicable campaign constraints, determining constraint compliance, determining shadow prices, determining error terms, and the like.

The predictive conversion rate determination module(s) 732 may include computer-executable instructions, code, or the like that responsive to execution by one or more of the processor(s) 702 may perform functions including, but not limited to, determining predictive conversion rates, updating or modifying predictive conversion rate algorithms, and the like.

Referring now to other illustrative components depicted as being stored in the data storage 714, the O/S 720 may be loaded from the data storage 714 into the memory 704 and may provide an interface between other application software executing on the remote server(s) 700 and hardware resources of the remote server(s) 700. More specifically, the O/S 720 may include a set of computer-executable instructions for managing hardware resources of the remote server(s) 700 and for providing common services to other application programs (e.g., managing memory allocation among various application programs). In certain example embodiments, the O/S 720 may control execution of the other program module(s) to dynamically enhance characters for content rendering. The O/S 720 may include any operating system now known or which may be developed in the future including, but not limited to, any server operating system, any mainframe operating system, or any other proprietary or non-proprietary operating system.

The DBMS 722 may be loaded into the memory 704 and may support functionality for accessing, retrieving, storing, and/or manipulating data stored in the memory 704 and/or data stored in the data storage 714. The DBMS 722 may use any of a variety of database models (e.g., relational model, object model, etc.) and may support any of a variety of query languages. The DBMS 722 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server(s) 700 is a mobile device, the DBMS 722 may be any suitable light-weight DBMS optimized for performance on a mobile device.

Referring now to other illustrative components depicted as being stored in the data storage 714, the O/S 720 may be loaded from the data storage 714 into the memory 704 and may provide an interface between other application software executing on the remote server(s) 700 and hardware resources of the remote server(s) 700. More specifically, the O/S 720 may include a set of computer-executable instructions for managing hardware resources of the remote server(s) 700 and for providing common services to other application programs (e.g., managing memory allocation among various application programs). In certain example embodiments, the O/S 720 may control execution of one or more of the program module(s) depicted as being stored in the data storage 714. The O/S 720 may include any operating system now known or which may be developed in the future including, but not limited to, any server operating system, any mainframe operating system, or any other proprietary or non-proprietary operating system.

The DBMS 722 may be loaded into the memory 704 and may support functionality for accessing, retrieving, storing, and/or manipulating data stored in the memory 704 and/or data stored in the data storage 714. The DBMS 722 may use any of a variety of database models (e.g., relational model, object model, etc.) and may support any of a variety of query languages. The DBMS 722 may access data represented in one or more data schemas and stored in any suitable data repository. In certain example embodiments, the DBMS 722 may be any suitable light-weight DBMS optimized for performance on a mobile device.

Referring now to other illustrative components of the remote server(s) 700, the input/output (I/O) interface(s) 706 may facilitate the receipt of input information by the remote server(s) 700 from one or more I/O devices as well as the output of information from the remote server(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(e) 718 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The remote server(s) 700 may further include one or more network interface(s) 708 via which the remote server(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(e) 718 may include any suitable type of antenna depending, for example, on the communications protocols used to transmit or receive signals via the antenna(e) 718. Non-limiting examples of suitable antennas may include directional antennas, non-directional antennas, dipole antennas, folded dipole antennas, patch antennas, multiple-input multiple-output (MIMO) antennas, or the like. The antenna(e) 718 may be communicatively coupled to one or more transceivers 712 or radio components to which or from which signals may be transmitted or received.

As previously described, the antenna(e) 718 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 718 may additionally, or alternatively, include a Wi-Fi antenna configured to transmit or receive signals in accordance with established standards and protocols, such as the IEEE 1002.11 family of standards, including via 2.4 GHz channels (e.g. 1002.11b, 1002.11g, 1002.11n), 5 GHz channels (e.g. 1002.11n, 1002.11ac), or 60 GHZ channels (e.g. 1002.11ad). In alternative example embodiments, the antenna(e) 718 may be configured to transmit or receive radio frequency signals within any suitable frequency range forming part of the unlicensed portion of the radio spectrum.

The antenna(e) 718 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(e) 718—transmitting or receiving radio frequency (RF) signals in the bandwidth and/or channels corresponding to the communications protocols utilized by the remote server(s) 700 to communicate with other devices. The transceiver(s) 712 may include hardware, software, and/or firmware for modulating, transmitting, or receiving—potentially in cooperation with any of antenna(e) 718—communications signals according to any of the communications protocols discussed above including, but not limited to, one or more Wi-Fi and/or Wi-Fi direct protocols, as standardized by the IEEE 1002.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the remote server(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 7 as being stored in the data storage 714 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the remote server(s) 700 may include alternate and/or additional hardware, software, or firmware components beyond those described or depicted without departing from the scope of the disclosure. More particularly, it should be appreciated that software, firmware, or hardware components depicted as forming part of the remote server(s) 700 are merely illustrative and that some components may not be present or additional components may be provided in various embodiments. While various illustrative program module(s) have been depicted and described as software module(s) stored in data storage 714, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-6 may be performed by a device having the illustrative configuration depicted in FIG. 7, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:

determining, by one or more computer processors coupled to at least one memory, content delivery campaign parameters for a content delivery campaign, the content delivery campaign parameters comprising a cost-per-action constraint value indicative of a target cost per desired action for the content delivery campaign;

receiving a bid request for an available content delivery slot, the bid request comprising context information for the available content delivery slot;

determining a set of candidate content for the available content delivery slot, the set of candidate content comprising first candidate content and second candidate content, wherein the first candidate content is content of the content delivery campaign;

determining a first base bid value for the first candidate content;

determining, using a predictive model, a probability of conversion for the first candidate content, wherein the probability of conversion represents a likelihood that a user will perform the desired action for a content impression served at the available content delivery slot;

determining a total consumed budget amount for delivering impressions of the content delivery campaign;

determining a total number of completed actions in response to delivered impressions for the content delivery campaign;

determining a first average cost-per-action for the content delivery campaign using the total consumed budget amount and the total number of completed actions;

determining a first difference between the first average cost-per-action and the cost-per-action constraint value;

determining an expected revenue for the available content delivery slot, wherein the expected revenue is revenue generated as a result of a conversion after presentation of the content impression;

determining a first bid modifier for the first candidate content using the probability of conversion, the first difference, and the expected revenue;
determining a first bid amount for the first candidate content using the first base bid value and the first bid modifier;
determining a second base bid value for the second candidate content;
determining a second bid modifier for the second candidate content;
determining a second bid amount for the second candidate content using the second base bid value and the second bid modifier;
ranking the first bid amount and the second bid amount;
determining that the first bid amount is greater than the second bid amount;
sending a response to the bid request, the response comprising the first bid amount;
initiating delivery of an impression of the first candidate content for presentation at the available content delivery slot;
initiating execution of a script comprising computer-executable instructions at a user device to monitor user behavior after the impression of the first candidate content is rendered at the user device, wherein the script causes the user device to transmit user interaction data to the one or more computer processors;
determining that the impression resulted in a conversion of the desired action by a user; and
updating the predictive model based at least in part on determining that the impression resulted in the conversion.

2. The method of claim 1, further comprising:
determining that the first bid amount is a winning bid amount.

3. The method of claim 2, further comprising:
determining a second average cost-per-action for the content delivery campaign using the first bid amount;
determining that a periodic time interval has elapsed; and
determining a second difference between the second average cost-per-action and the cost-per-action constraint value.

4. The method of claim 1, further comprising:
determining that the first candidate content is associated with a budget consumption constraint, the budget consumption constraint indicating a target daily budget consumption;
determining that the first difference does not satisfy the cost-per-action constraint value;
determining that a consumed daily budget for a day is at least a predetermined portion of the target daily budget consumption, wherein the predetermined portion is less than the target daily budget consumption; and
pausing the budget consumption constraint for a remainder of the day.

5. A method comprising:
receiving, by one or more computer processors coupled to at least one memory, a bid request for an available content delivery slot, the bid request comprising context information;
determining first candidate content for the available content delivery slot;
determining a first base bid value for the first candidate content;
determining, using a predictive model, a predicted conversion rate for an impression of the first candidate content served at the available content delivery slot;
determining an estimated revenue for serving the impression of the first candidate content at the available content delivery slot, wherein the estimated revenue is revenue generated as a result of a conversion after presentation of the impression;
determining a first bid modifier using the predicted conversion rate and the estimated revenue;
sending a response to the bid request comprising a first bid amount, wherein the first bid amount is based at least in part on the first base bid value and the first bid modifier;
initiating delivery of the impression of the first candidate content to a user device;
initiating execution of a script comprising computer-executable instructions at the user device to monitor user behavior after the impression of the first candidate content is rendered at the user device, wherein the script causes the user device to transmit user interaction data to the one or more computer processors;
determining that a user performed a desired action after delivery of the impression of the first candidate content, the desired action representing a conversion event; and
updating the predictive model based at least in part on determining that the impression resulted in the conversion.

6. The method of claim 5, further comprising:
determining that the first candidate content is associated with a content delivery campaign having a cost-per-action constraint, the cost-per-action constraint comprising a target cost per desired action; and
determining a difference between an average cost-per-action for the content delivery campaign and the target cost per desired action;
wherein determining the first bid modifier using the predicted conversion rate and the estimated revenue comprises determining the first bid modifier using the predicted conversion rate, the estimated revenue, and the difference.

7. The method of claim 5, wherein determining the predicted conversion rate for an impression of the first candidate content served at the available content delivery slot comprises:
determining targeting criteria for the first candidate content; and
generating a probability that the impression of the first candidate content will be consumed based at least in part on the targeting criteria and the context information.

8. The method of claim 5, further comprising:
determining second candidate content for the available content delivery slot;
determining a second base bid value for the second candidate content;
determining a second bid modifier;
determining a second bid amount for the second candidate content using the second base bid value and the second bid modifier; and
ranking the first bid amount and the second bid amount.

9. The method of claim 8, further comprising:
determining that the first bid amount is greater than the second bid amount.

10. The method of claim 5, further comprising:
determining that the first bid amount is a winning bid amount.

11. The method of claim 5, wherein determining that the user performed the desired action after delivery of the impression of the first candidate content comprises:

presenting the impression of the first candidate content at the available content delivery slot;
monitoring user behavior after presenting the impression; and
determining that a conversion event has occurred.

12. The method of claim 5, further comprising:
determining a first average cost-per-action for the content delivery campaign;
determining that a predetermined time interval has elapsed;
determining a second average cost-per-action for the content delivery campaign; and
determining a difference between the second average cost-per-action for the content delivery campaign and a target cost-per-action for the content delivery campaign.

13. The method of claim 12, wherein the bid request is a first bid request, the method further comprising:
receiving a second bid request;
determining a third base bid for the first candidate content; and
determining a third bid modifier for the first candidate content using the difference.

14. The method of claim 5, further comprising:
receiving a user action confirmation notification from the user device; and
determining that a desired action was performed by the user based at least in part on the user action confirmation notification, the desired action representing a conversion event.

15. The method of claim 5, further comprising:
determining that the first candidate content is associated with a cost-per-action constraint, the cost-per-action constraint comprising a target cost per desired action;
determining that the first candidate content is associated with a budget consumption constraint, the budget consumption constraint indicating a target daily budget consumption;
determining that an average cost-per-action for the content delivery campaign is greater than or less than the target cost per desired action;
determining that a consumed daily budget for a day is at least a predetermined portion of the target daily budget consumption, wherein the predetermined portion is less than the target daily budget consumption; and
pausing the budget consumption constraint for a remainder of the day.

16. The method of claim 15, further comprising:
determining that the average cost-per-action for the content delivery campaign is within a predetermined threshold of the target cost per desired action; and
unpausing the budget consumption constraint.

17. A device comprising:
at least one memory that stores computer-executable instructions; and
at least one processor configured to access the at least one memory and execute the computer-executable instructions to:
receive a bid request for an available content delivery slot, the bid request comprising context information;
determine first candidate content for the available content delivery slot;
determine a first base bid value for the first candidate content;
determine, using a predictive model, a predicted conversion rate for an impression of the first candidate content served at the available content delivery slot;
determine an estimated revenue for serving the impression of the first candidate content at the available content delivery slot, wherein the estimated revenue is revenue generated as a result of a conversion after presentation of the impression;
determine a first bid modifier using the predicted conversion rate and the estimated revenue;
send a response to the bid request comprising a first bid amount, wherein the first bid amount is based at least in part on the first base bid value and the first bid modifier; and
initiate execution of a script comprising computer-executable instructions at a user device to monitor user behavior after the impression of the first candidate content is rendered at the user device, wherein the script causes the user device to transmit user interaction data to the device;
determine that the impression resulted in a conversion; and
update the predictive model based at least in part on the determination that the impression resulted in the conversion.

18. The device of claim 17, wherein the at least one processor is further configured to access the at least one memory and execute the computer-executable instructions to:
determine that the first candidate content is associated with a content delivery campaign having a cost-per-action constraint, the cost-per-action constraint comprising a target cost per desired action; and
determine a difference between an average cost-per-action for the content delivery campaign and the target cost per desired action;
wherein the at least one processor is configured to determine the first bid modifier using the predicted conversion rate and the estimated revenue by executing the computer-executable instructions to determine the first bid modifier using the predicted conversion rate, the estimated revenue, and the difference.

19. The device of claim 17, wherein the at least one processor is further configured to access the at least one memory and execute the computer-executable instructions to:
receive a user action confirmation notification from the user device; and
determine that a desired action was performed by the user based at least in part on the user action confirmation notification, the desired action representing a conversion event.

20. The device of claim 17, wherein the at least one processor is further configured to access the at least one memory and execute the computer-executable instructions to:
determine that the first candidate content is associated with a cost-per-action constraint, the cost-per-action constraint comprising a target cost per desired action;
determine that the first candidate content is associated with a budget consumption constraint, the budget consumption constraint indicating a target daily budget consumption;
determine that an average cost-per-action for the content delivery campaign is greater than or less than the target cost per desired action;
determine that a consumed daily budget for a day is at least a predetermined portion of the target daily budget consumption, wherein the predetermined portion is less than the target daily budget consumption; and
pause the budget consumption constraint for a remainder of the day.

* * * * *